(12) United States Patent  (10) Patent No.: US 8,160,405 B2
Nagarajan et al.  (45) Date of Patent: Apr. 17, 2012

(54) OPTICAL INTEGRATED CIRCUIT

(75) Inventors: Radhakrishnan L. Nagarajan, Cupertino, CA (US); Masaki Kato, Palo Alto, CA (US); Vikrant Lal, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 294 days.

(21) Appl. No.: 12/646,340

(22) Filed: Dec. 23, 2009

(65) Prior Publication Data

US 2011/0150384 A1 Jun. 23, 2011

(51) Int. Cl.
*G02B 6/00* (2006.01)
*G02B 6/10* (2006.01)
(52) U.S. Cl. ............................ 385/11; 385/129; 385/131
(58) Field of Classification Search .................... 385/11, 385/129–132
See application file for complete search history.

(56) References Cited

U.S. PATENT DOCUMENTS

| 7,212,087 | B2 * | 5/2007 | Nagai | 333/210 |
| 2006/0018584 | A1 * | 1/2006 | Watts et al. | 385/11 |
| 2006/0097816 | A1 * | 5/2006 | Nagai | 333/21 A |
| 2010/0002989 | A1 * | 1/2010 | Tokushima | 385/14 |
| 2011/0150384 | A1 * | 6/2011 | Nagarajan et al. | 385/11 |

* cited by examiner

*Primary Examiner* — Rhonda Peace
(74) *Attorney, Agent, or Firm* — David L. Soltz (57) ABSTRACT

Consistent with the present disclosure, a non-adiabatic polarization rotator is provided that can rotate the polarization of an incoming over a relatively short length. Light is supplied to the polarization rotator via a polarizer, which insures that the optical input to the polarization polarization rotator has a desired polarization. Preferably, the polarization rotator has a structure that is readily implemented with semiconductor materials and can be fabricated with known processing techniques. In addition, the polarization rotator and polarizer may include similar materials and/or layers, such that both may be readily integrated on a common substrate, such as an indium phosphide (InP) substrate.

20 Claims, 9 Drawing Sheets

OPTICAL INTEGRATED CIRCUIT

BACKGROUND

An electromagnetic wave, such as a light wave, has an associated vector field that has two primary and orthogonal polarization states or vector directions. When referring to the propagation of light in a waveguide provided on a substrate, these polarization states are generally referred to as the Transverse Electric (TE) mode and Transverse Magnetic (TM) mode. In the TM mode, the electric field of the light wave is oriented perpendicular to the substrate on which the waveguide sits, while in the TE mode the electric field is oriented parallel to the substrate.

Optical components, referred to as polarization rotators, can rotate the polarization of an optical signal, for example, from a TE mode to a TM mode. As generally understood, many rotators are made of a birefringent material, whereby the refractive index of such material along one polarization direction or birefringent axis is different than the refractive index in a different polarization direction or birefringent axis. The polarization of light propagating through such material can be resolved into different polarization components (e.g., a TE component and a TM component) and the refractive index difference causes these polarization components to travel at different speeds so that a phase difference develops between them. Accordingly, the net polarization of light traveling through the rotator, i.e., the vector sum of the polarization components, is rotated.

So-called "adiabatic rotators" have a geometry that introduces a gradual twist or rotation of the birefringent axes over the length of the rotator. As light propagates through the adiabatic rotator, the TE and TM polarization components will align with the birefringent axes of the rotator. If the twist is sufficiently gradual, the polarization states of the light will follow birefringent axes and rotate along with them. Adiabatic rotators may be wavelength independent and less fabrication sensitive and may not require that the polarization of light input to the rotator be aligned at a particular angle relative to birefringent axes.

Recently, photonic integrated circuits (PICs) have been proposed in which multiple optical components are provided on a semiconductor substrate. Adiabatic rotators, as noted above, gradually rotate the polarization of light supplied thereto, and are therefore relatively long. Accordingly, adiabatic rotators may not be adequately integrated onto a PIC having reduced dimensions.

Thus, there is a need for a polarization rotator having reduced size that can be integrated on a PIC.

SUMMARY OF THE INVENTION

Consistent with the present disclosure, an apparatus, such as a non-adiabatic polarization rotator, is provided that includes a substrate and a first waveguide portion provided on the substrate. The first waveguide portion is configured to receive an optical signal having a first polarization. A second waveguide portion is also provided on the substrate and the optical signal propagates in the second waveguide in a first direction along a length of the second waveguide. The second waveguide portion has first and second eigen modes oriented along second and third polarizations, respectively, as well as a first part and a second part that is provided between the first part and the substrate. The first part of the second waveguide portion has a first height and width that is substantially uniform along the length of the second waveguide, and second part having second height and width that is substantially uniform along the length of the second waveguide. The second width is greater than the first width, and the first width is uniform in a second direction transverse to the first direction. In addition, the second width is uniform in the second direction. Further, a third waveguide portion is provided on the substrate, which receives the optical signal from the second waveguide portion, wherein the second waveguide portion has a first mode index associated with the second polarization and a second mode index associated with the third polarization. The second and third polarizations rotate over the length of the second waveguide portion. Further, the optical signal has a fourth polarization, different than the first polarization, in the third waveguide portion.

It is to be understood that both the foregoing general description and the following detailed description are exemplary and explanatory only and are not restrictive of the invention, as claimed.

The accompanying drawings, which are incorporated in and constitute a part of this specification, illustrate several embodiment and together with the description, serve to explain the principles of the invention.

DESCRIPTION OF THE EMBODIMENTS

Consistent with the present disclosure, an optical integrated circuit is provided that includes a non-adiabatic polarization rotator that rotates the polarization of an incoming optical signal over a relatively short length. Light is supplied to the polarization rotator via a polarizer, which insures that the optical input to the polarization rotator has a desired polarization. Preferably, the polarization rotator has a structure that is readily implemented with semiconductor materials and can be fabricated with known processing techniques. In addition, the polarization rotator and polarizer may include similar materials and/or layers, such that both may be readily integrated on a common substrate, such as an indium phosphide (InP) substrate.

Reference will now be made in detail to the present exemplary embodiments, examples of which are illustrated in the accompanying drawings. Wherever possible, the same reference numbers will be used throughout the drawings to refer to the same or like parts.

Figure 1:
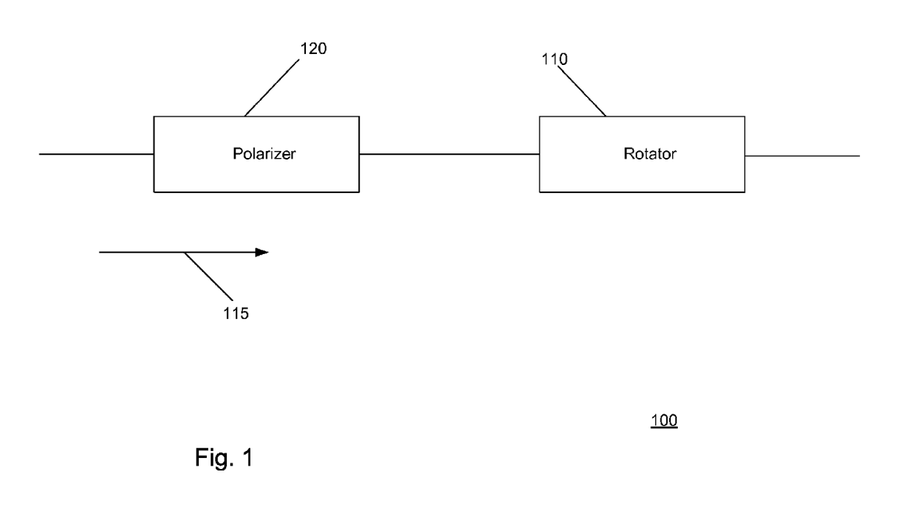
FIG. 1 illustrates an example of an optical circuit consistent with an aspect of the present disclosure.

FIG. 1 illustrates a block diagram of an optical integrated circuit or optical circuit 100 consistent with an aspect of the present invention. Optical circuit 100 may include an optical polarizer 120 that receives incoming light or an optical signal in a direction represented by arrow 115 (as used herein, arrow 115 may also represent the light or optical signal itself) and passes such light to polarization rotator 110. Preferably, the polarization of optical signal 115 is oriented at a particular angle relative to the birefringent states (or eigen modes) of polarization rotator (or "rotator") 110 so that rotator 110 operates in an optimal fashion to rotate the polarization of optical signal 115, as discussed in greater detail below.

Figure 2:
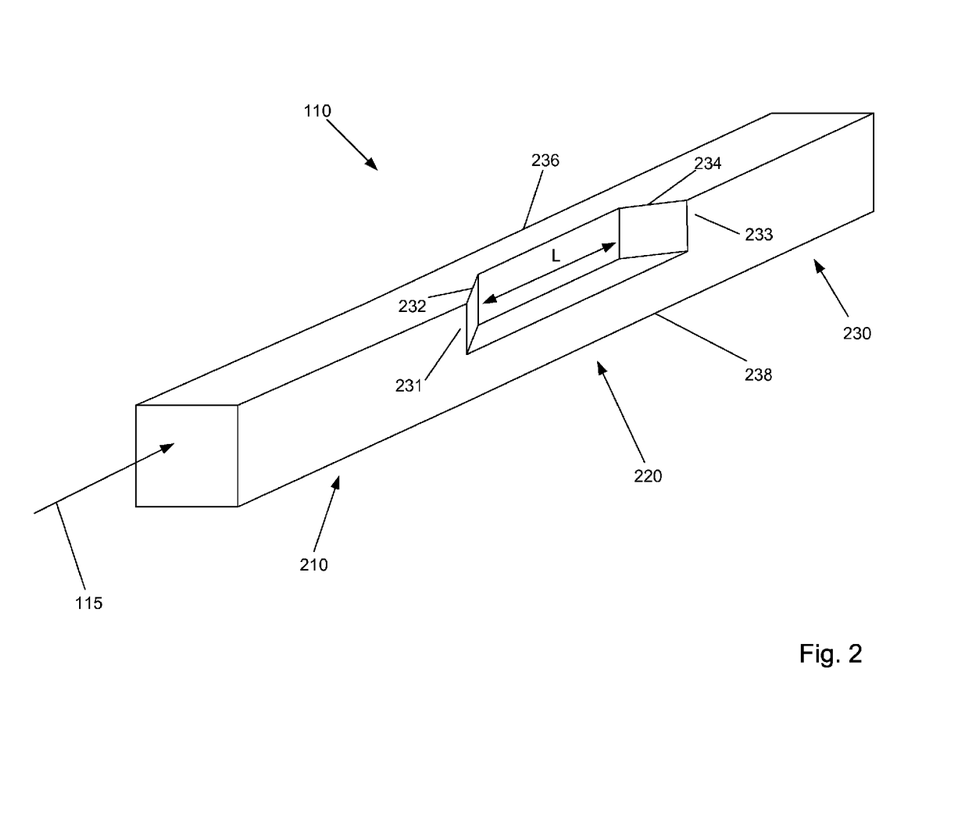
FIG. 2 illustrates a perspective view of a polarization rotator consistent with an aspect of the present disclosure.
Figure 3:
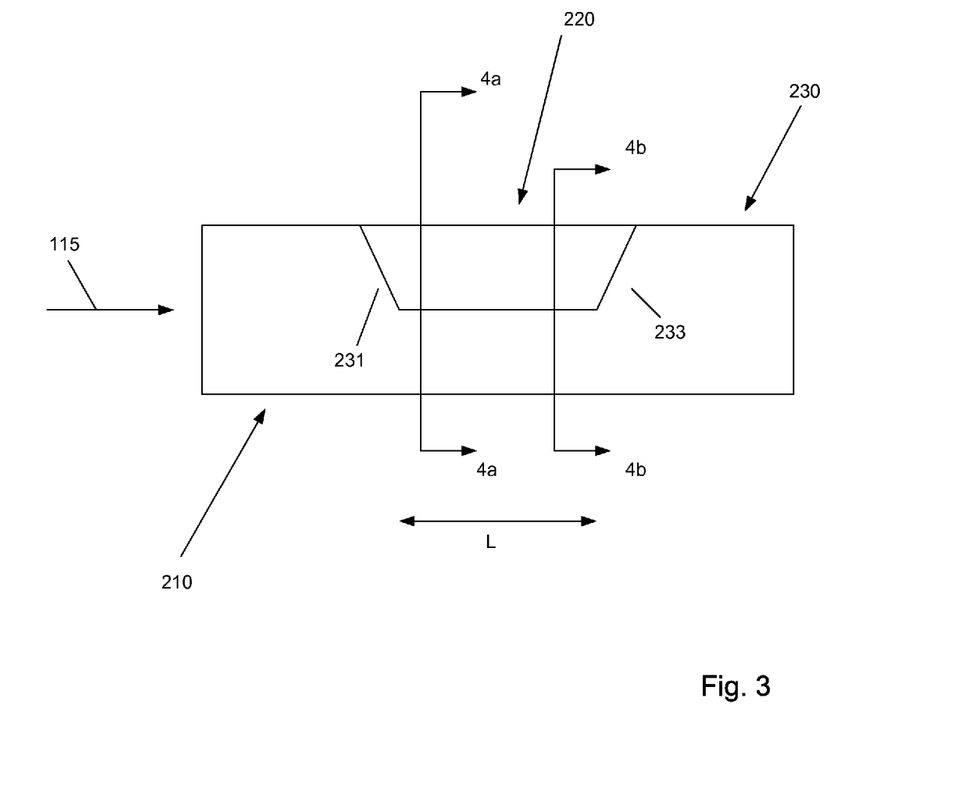
FIG. 3 is a plan view of the polarization rotator shown in FIG. 2.

FIGS. 2 and 3 illustrate perspective and plan views of rotator 110, respectively. Rotator 110 includes a first waveguide portion 210 that receives optical signal 115, which is preferably polarized after being output from polarizer 120. Optical signal 115 is next fed to second waveguide portion 220 via first tapered section 231, which may be included in first waveguide portion 210. Tapered section 231 has an angled face 232 to minimize the interface loss between the eigen modes of first waveguide portion 210 and the eigen modes of second waveguide portion 220.

Figure 4A:
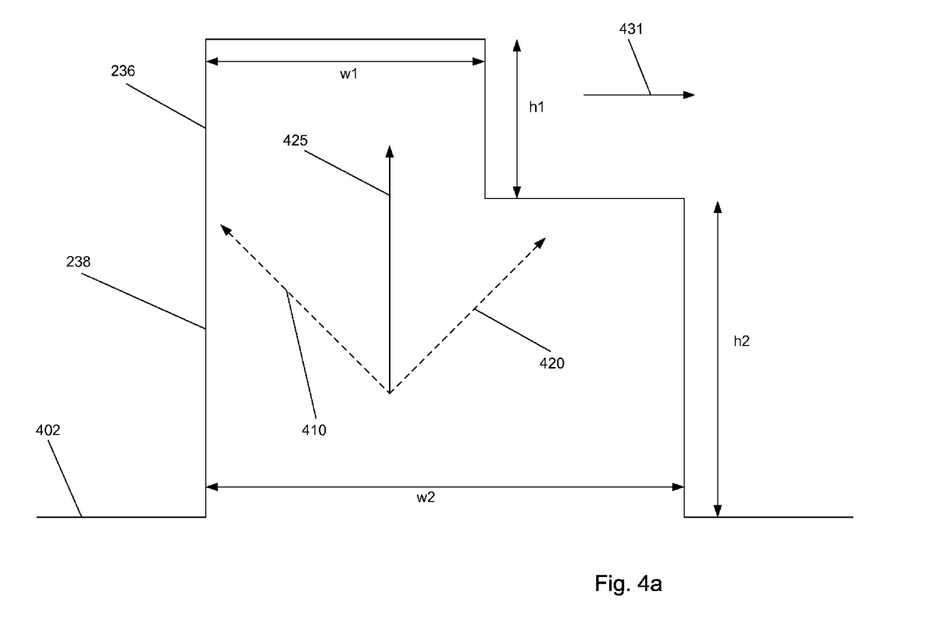
FIGS. 4a, 4b, and 5 illustrates cross-sectional views of the polarization rotator shown in FIG. 2.
Figure 4B:
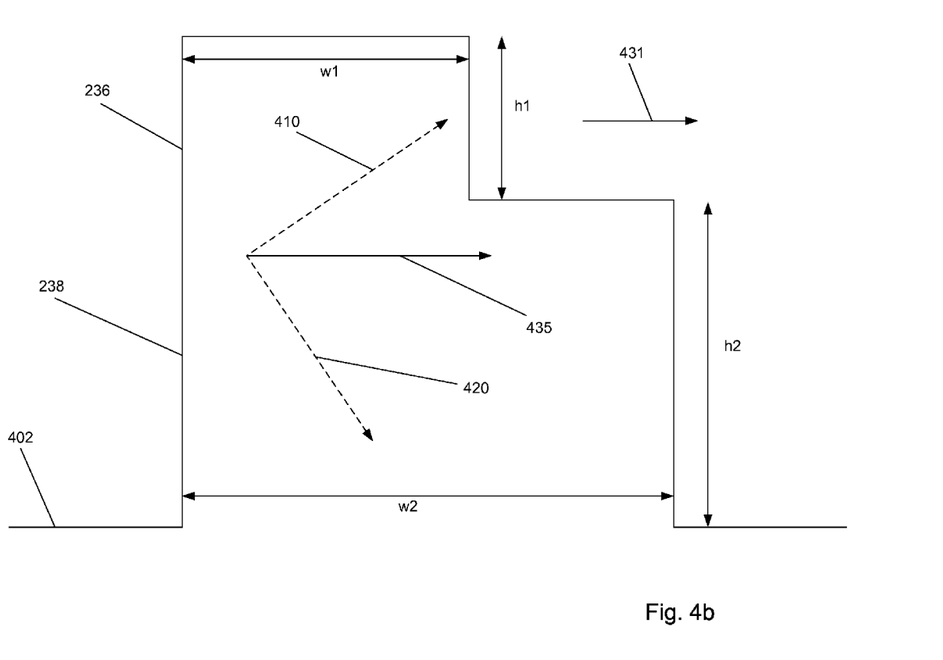

As further shown in FIGS. 2 and 3, second waveguide portion 220 has a first part 236 and a second part 238, which as shown in FIGS. 4a and 4b, is provided between first part 236 and substrate 402. First part 236 has a substantially uniform height and width along the length L of second waveguide portion 220. Second part 238 also has a substantially uniform height and width along length L, but the height and width of second part 238 are greater than the height and width of first part 236, such that the polarization of optical signal 115 is rotated or changed during propagation through second waveguide portion 220. Optical signal 115 having the rotated or changed polarization is next supplied to third waveguide portion 230 via second tapered section 233. Tapered section 233 has an angled portion or face 234 to minimize the interface loss between the eigen modes of the second waveguide portion 220 and the eigen modes of third waveguide portion 230. Tapered portion 233 may be included in third waveguide portion 230. Preferably, optical signal 115 retains the rotated polarization during propagation through third waveguide section 230. In addition, as further shown in FIGS. 2 and 3, second waveguide portion 220 joins the first (210) and third (230) waveguide portions.

Operation of rotator 110 will next best described with reference to FIGS. 4a and 4b, which illustrate cross-sectional views of second waveguide portion 220 taken along lines 4a-4a and 4b-4b, respectively, in FIG. 3. Rotator 110 and polarizer 120 are provided on substrate 402 (not shown in FIGS. 1-3), and, as noted above, rotator 110 includes first and second parts 236 and 238, respectively. First part 236 has a first height (h1) and a first width (w1) that is uniform along length L of second waveguide portion 220, and second part 238 has a second height (h2) and second width (w2) that is also uniform along length L. In addition, width w1 and width w2 are uniform in a direction that is transverse to propagation direction of optical signal 115 (see arrow 431).

The dimensions of widths w1 and w2 are selected so that second waveguide portion 220 has first and second eigen modes represented by arrows or vectors (also referred to as polarizations) 410 and 420, respectively. Preferably, the polarization of optical signal 115, when input to second waveguide portion 220, has a polarization or vector 425 that is aligned with a resultant vector of eigen modes 410 and 420. In this example, polarization 425 forms a 45 degree angle with eigen mode 410 and with eigen mode 420. Polarizer 120 may set the polarization of optical signal 115 to a preferred orientation to facilitate rotation by rotator 110.

The widths (w1 and w2) and heights (h1 and h2) of the second waveguide portion are further preferably selected so that second waveguide portion 220 has a first mode index associated with eigen mode or polarization 410 and a second mode index associated with eigen mode or polarization 420 that is different than the first mode index. Polarization 425 associated with optical signal 115 may be resolved into different polarization components that are aligned with eigen modes 410 and 420, and the mode index difference causes these polarization components to travel at different speeds so that a phase difference develops between them. Accordingly, the net polarization (i.e., polarization 475) of optical signal 115, i.e., the sum of the polarization components, as well as the eigen modes themselves, are rotated. For example, as shown in FIG. 4b, the above-noted mode index differences result in a rotation of eigen modes 410 and 420, as well as the polarization of optical signal 115, so that optical signal 115 has a different polarization 435 upon exiting second waveguide portion 220. Such rotation occurs during propagation over length L of second waveguide portion 220.

In one example, length L is selected so that the output polarization 435 is rotated 90 degrees and is thus orthogonal relative to input polarization 425 to waveguide portion 220. Accordingly, input polarization 425 may be TE and the output polarization may be TM. Alternatively, input polarization 425 may be TM and the output polarization may be TE.

Figure 5:
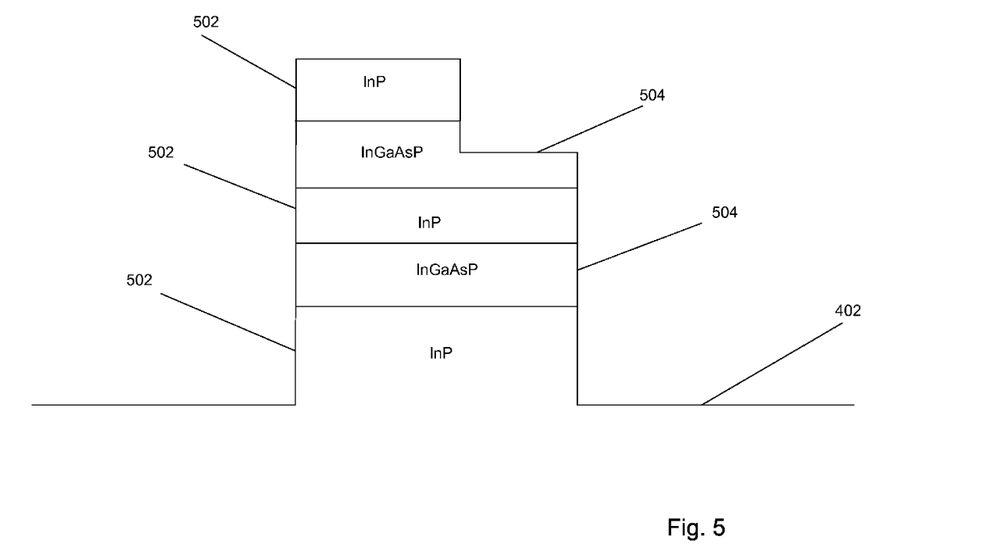

FIG. 5 illustrates a detailed cross-sectional view of an exemplary second waveguide portion 220. Here, second waveguide portion 220 includes first (502) and second (504) pluralities of alternating high and low refractive index layers. For example, layers 502 may include indium phosphide (InP), which has a relatively low refractive index, and layers 504 may include a quaternary alloy including indium, phosphorus, gallium, and arsenic (InGaAsP) having a relatively high refractive index. Alternatively, layers 504 may include another high refractive index material, such as a quaternary alloy including indium, gallium, aluminum, and arsenic (InGaAlAs). Substrate 402 may further include InP, so that the above-described rotator may be readily integrated onto substrate 402 using known processing techniques.

As noted above, in order to achieve optimal performance of rotator 110 so that a substantial portion of optical signal 115 input to rotator 110 is output with the desired rotated polarization, the input polarization (e.g., polarization 425) may be set or aligned with the resultant vector associated with eigen modes 410 and 420. Accordingly, polarizer 120 may be provided to achieve such polarization alignment.

Figure 6:
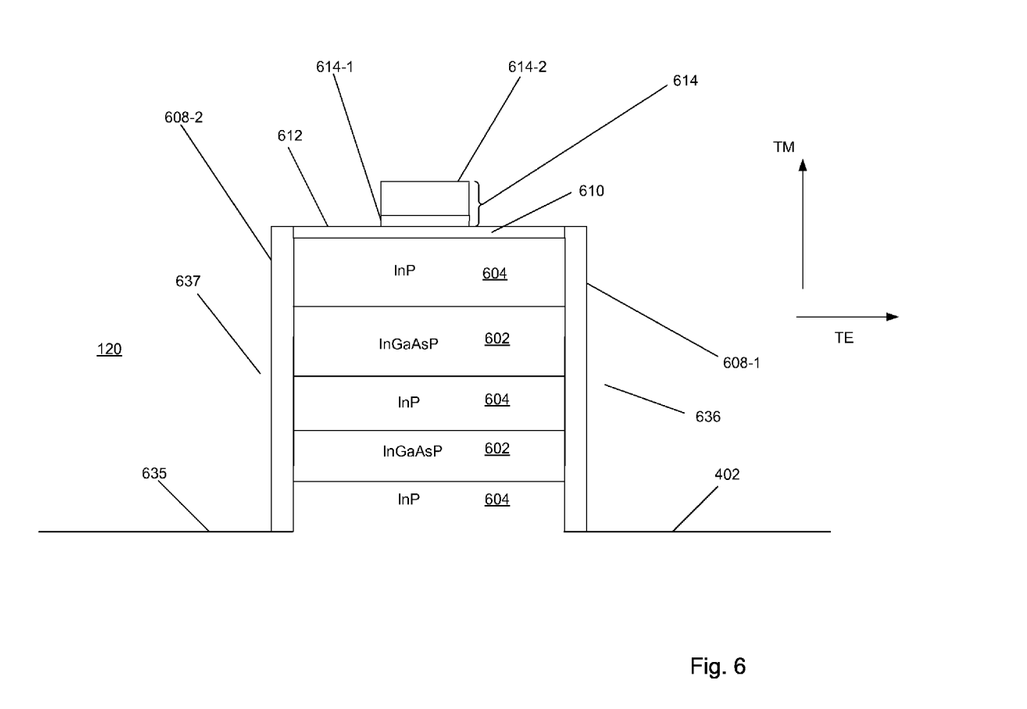
FIG. 6 illustrates an example of a first polarizer consistent with an aspect of the present disclosure.

A cross-sectional view of an exemplary polarizer 120 is shown in FIG. 6. Polarizer 120 may also be provided on substrate 402 and may include first (602) and second (604) pluralities of alternating high and low refractive index layers. For example, layers 602 may include indium phosphide (InP) and have a relatively low refractive index and layers 604 may include a quaternary alloy including indium, phosphorus, gallium, and arsenic (InGaAsP) having a relatively high refractive index. Polarizer 120 may thus be integrated on the same substrate (402) as rotator 110 and formed using at least some of the same processing steps as those used to form rotator 110. Layers 602 and 604 are the same or similar to layers 502 and 504, respectively.

Polarizer 120 further includes a dielectric layer, such as silicon nitride (SiN) layer 610 provided on a top-most layer 604, in this example, such that polarizer 120 has a top surface 612 that extends parallel to a surface 635 of substrate 402. Additional dielectric layers, such as silicon nitride layers 608-1 and 608-2 may also be provided on sides 636 and 637 of polarizer 120, respectively. Preferably, a metal layer 614 may be provided on top surface 612, and the thicknesses of layers 610 and 614 are selected so that the loss associated with light having a TM polarization (note arrow TM in FIG. 6) is substantially increased, thereby attenuating such TM polarized light. On the other hand, light having a TE polarization (note arrow TE in FIG. 6) passes through polarizer 120 with relatively little loss, such that the optical signal or light that emerges from polarizer 120 has a TE polarization. Accordingly, polarizer 120 is a TE polarizer in the example shown in FIG. 6. Layers 608-1, 608-2, and 610 may have a thickness that ranges from zero to some finite thickness.

Further, in the example, shown in FIG. 6, metal layer 614 may include first and second metal sub-layers 614-1 and 614-2 including titanium and gold, respectively.

Figure 7:
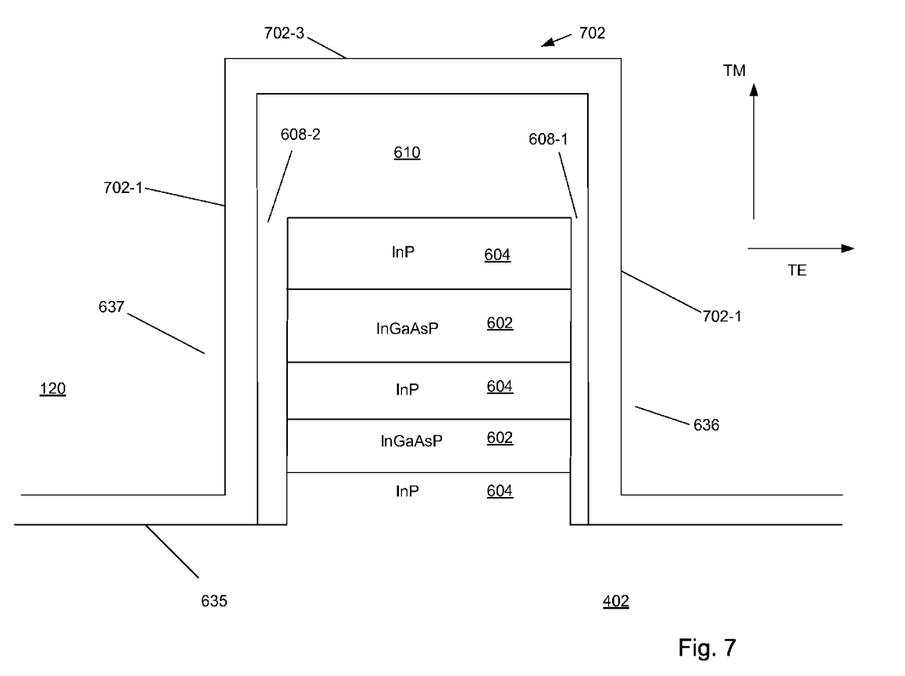
FIG. 7 illustrates an example of a second polarizer consistent with an aspect of the present disclosure.

FIG. 7 illustrates an alternative polarizer 120 consistent with an additional aspect of the present disclosure. In FIG. 7, alternating pluralities of first (602) and second (604) high and low refractive index layers are provided as in FIG. 6. Dielectric layers, such as silicon nitride layers 610, 608-1, and 608-2 are also provided on a top-most layer 604, side 636, and side 637, respectively. A metal layer 702 (including portions 702-1 and 702-2) is provided on silicon nitride layers 608-1, 608-2, and 610, and may coat substantial portions of surface 635 of substrate 402. It is understood that metal layer 702 may include a plurality of metal sub-layers, similar to gold and titanium sub-layers 614-1 and 614-2 discussed above.

Preferably, the thicknesses of layers 608-1 and 608-2, as well as metal layer portions 702-1, and 702-2 are selected so that the loss associated with light having a TE polarization (note arrow TE in FIG. 7) is substantially increased, thereby attenuating such TE polarized light. It is noted that silicon nitride layer 610 in FIG. 7 is relatively thick, such that light having a TM polarization does not interact with metal layer portion 702-3 and incurs little loss. Accordingly, TM polarized light (note arrow TM in FIG. 7) passes through polarizer 120 with relatively low loss, such that the optical signal or light that emerges from polarizer 120 has a TM polarization. Accordingly, polarizer 120 is a TM polarizer in the example shown in FIG. 7.

Figure 8:
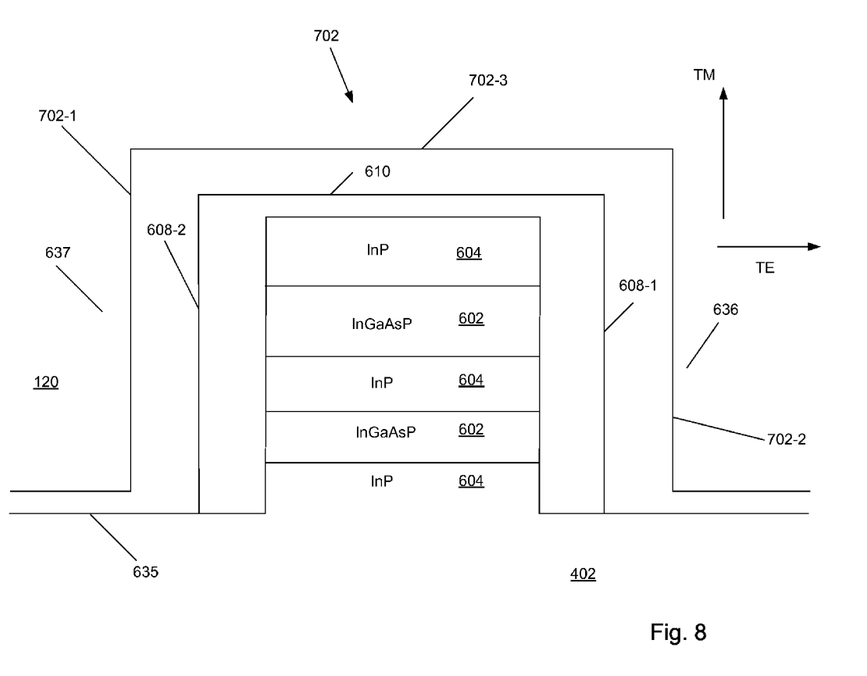
FIG. 8 illustrates a further example of polarizer consistent with the present disclosure.

FIG. 8 illustrates another example of polarizer 120 consistent with another aspect of the present disclosure. Polarizer 120 shown in FIG. 8 is similar to that shown in FIG. 7. In FIG. 8, however, dielectric or silicon nitride layers 608-1 and 608-2 are relatively thick, while dielectric layer 610 is relatively thin. Here, as in FIG. 7, metal layer 702 coats or is provided on substantial portions of substrate surface 635. However, since layers 608-1 and 608-2 are relatively thick, metal layer portions 702-1 and 702-2 do not interact with light having a TE polarization. On the other hand, dielectric or silicon nitride layer 610 beneath metal layer portion 702-3 is relatively thin. Accordingly, TM polarized light, which is oriented vertically in FIG. 8, (note the arrow labeled TM), interacts with metal layer portion 702-3 and is attenuated. Thus, TE polarized light is passed through polarizer 120 shown in FIG. 8, while TM light incurs substantial loss. Polarizer 120 shown in FIG. 8, therefore, is another example of a TE polarizer.

As discussed above, a non-adiabatic rotator having a relatively short length, at least compared to an adiabatic rotator, may be provided. The layers and materials that constitute at least part of the adiabatic rotator may be the same or similar to that of a polarizer, thereby facilitating integration of both the polarizer and rotator on a common substrate. Accordingly, the rotator and polarizer consistent with the present disclosure may be included in a photonic integrated circuit.

Other embodiments of the invention will be apparent to those skilled in the art from consideration of the specification and practice of the invention disclosed herein. For example, although width w1 of first part 236 of second waveguide portion 220 is disclosed above as being uniform along length L of second waveguide portion 220, it is understood that width w1 may narrow or taper, for example, in a direction from first waveguide portion 210 to third waveguide portion 230. In that case, the first part may terminate at a location spaced from the third waveguide portion, and height h1 of first part 236 may be uniform over length L. In addition, one or more additional polarizers similar to or the same as polarizer 120 discussed in connection with FIGS. 1, 6, and 7 may be provided at the input of rotator 120, and such polarizers may also be provided at the output of rotator 120. Moreover, it is understood, that the number of layers that constitute the polarizers and rotators discussed above, as well as the materials that make up those layers are limited to that described above. Rather, any appropriate number of layers having any suitable composition is contemplated herein. It is intended that the specification and examples be considered as exemplary only, with a true scope and spirit of the invention being indicated by the following claims.

What is claimed is:

1. An apparatus, comprising:
   a substrate;
   a first waveguide portion provided on the substrate and configured to receive an optical signal having a first polarization;
   a second waveguide portion having a length and being provided on the substrate, the optical signal propagating in the second waveguide in a first direction, the first waveguide portion supplying the optical signal to the second waveguide portion, the second waveguide portion having first and second eigen modes oriented along second and third polarizations, respectively, the second waveguide having a first part and a second part that is provided between the first part and the substrate, the first part having a first height and width that is substantially uniform along the length of the second waveguide and second part having second height and width that is substantially uniform along the length of the second waveguide, the second width being greater than the first width, the first width also being uniform in a second direction transverse to the first direction and the second width also being uniform in the second direction; and
   a third waveguide portion provided on the substrate, the third waveguide portion receiving the optical signal from the second waveguide portion,
   wherein the second waveguide portion has a first mode index associated with the second polarization and a second mode index associated with the third polarization, such that the second and third polarizations rotate over the length of the second waveguide portion, and the optical signal has a fourth polarization, different than the first polarization, in the third waveguide portion.

2. The apparatus in accordance with claim 1, wherein the first, second, and third polarizations have associated first, second, and third vectors, respectively, a resultant fourth vector of the second and third vectors being aligned with the first vector.

3. The apparatus in accordance with claim 1, wherein the second waveguide portion joins the first and third waveguide portions.

4. The apparatus in accordance with claim 1, wherein the waveguide includes a plurality of layers.

5. The apparatus in accordance with claim 4, wherein first ones of the plurality of layers have a first refractive index and second ones of the plurality of layers having a second refractive index that is greater than the first refractive index.

6. The apparatus in accordance with claim 5, wherein the first refractive index include a first semiconductor and the second refractive index includes a second semiconductor.

7. The apparatus in accordance with claim 5, wherein the first semiconductor includes indium phosphide (InP) and the second semiconductor includes a quaternary alloy having indium, gallium, arsenic, and phosphorus.

8. The apparatus in accordance with claim 1, wherein the first polarization is a transverse electric (TE) polarization and the fourth polarization is a transver magnetic (TM) polarization.

9. The apparatus in accordance with claim 1, wherein the first polarization is a transverse electric (TM) polarization and the fourth polarization is a transver magnetic (TE) polarization.

10. The apparatus in accordance with claim 1, wherein the first polarization is orthogonal to the fourth polarization.

11. The apparatus in accordance with claim 1, wherein a width of the first waveguide portion is greater than the first width of the first part of the second waveguide portion.

12. The apparatus in accordance with claim 1, wherein the first, second, and third waveguide portions constitute a non-adiabatic rotator.

13. An apparatus, comprising:
a substrate;
a polarizer provided on the substrate, the polarizer being configured to supply and optical signal having a first polarization;
a rotator provided on the substrate, the rotator including:
a first waveguide portion provided on the substrate and configured to receive the optical signal having the first polarization;
a second waveguide portion having a length and being provided on the substrate, the optical signal propagating in the second waveguide in a first direction, the first waveguide portion supplying the optical signal to the second waveguide portion, the second waveguide portion having first and second eigen modes oriented along second and third polarizations, respectively, the second waveguide having a first part and a second part that is provided between the first part and the substrate, the first part having a first height and width that is substantially uniform along the length of the second waveguide and second part having second height and width that is substantially uniform along the length of the second waveguide, the second width being greater than the first width, the first width also being uniform in a second direction transverse to the first direction and the second width also being uniform in the second direction; and
a third waveguide portion provided on the substrate, the third waveguide portion receiving the optical signal from the second waveguide portion,
wherein the second waveguide portion has a first mode index associated with the second polarization and a second mode index associated with the third polarization, such that the second and third polarizations rotate over the length of the second waveguide portion, and the optical signal has a fourth polarization, different than the first polarization, in the third waveguide portion.

14. An apparatus in accordance with 13, wherein the first, second, and third polarizations have associated first, second, and third vectors, respectively, a resultant fourth vector of the second and third vectors being aligned with the first vector.

15. The apparatus in accordance with claim 13, wherein the first polarization is a transverse electric (TM) polarization and the fourth polarization is a transver magnetic (TE) polarization.

16. The apparatus in accordance with claim 15, wherein the polarizer includes a fourth waveguide portion, the fourth waveguide portion, having a top surface, which extends parallel to a surface of the substrate, and a side surface that extends from the top surface to the surface of the substrate, a metal layer being provided on the top surface to thereby attenuate a component of the optical signal propagating in the polarizer and having the TM polarization.

17. The apparatus in accordance with claim 16, wherein the metal layer includes a first layer including titanium and a second layer including gold.

18. The apparatus in accordance with claim 13, wherein the first polarization is a transverse electric (TE) polarization and the fourth polarization is a transverse magnetic (TM) polarization.

19. The apparatus in accordance with claim 18, wherein the polarizer includes a fourth waveguide portion, the fourth waveguide portion, having a top surface, which extends parallel to a surface of the substrate, and a side surface that extends from the top surface to the surface of the substrate, a metal layer being provided on the side surface to thereby attenuate a component of the optical signal propagating in the polarizer and having the TE polarization.

20. The apparatus in accordance with claim 13, wherein the polarizer includes a plurality of layers provided on the substrate, first ones of the plurality of layers having a first refractive index and the second ones of the plurality of optical signals.

* * * * *